July 27, 1926.
H. J. RUCH
1,594,121
STEAM PLATEN AND METHOD OF MAKING SAME
Filed Nov. 20, 1925
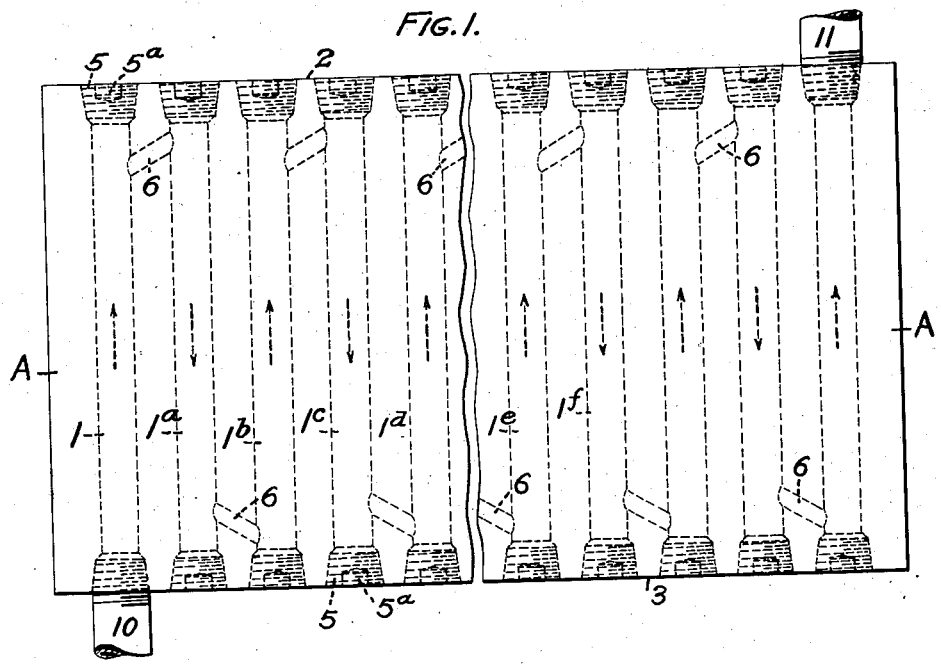
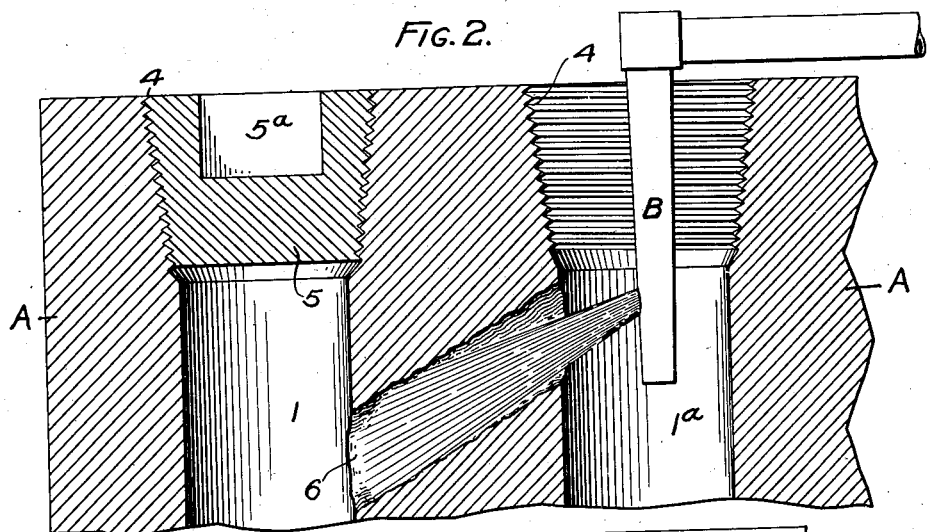
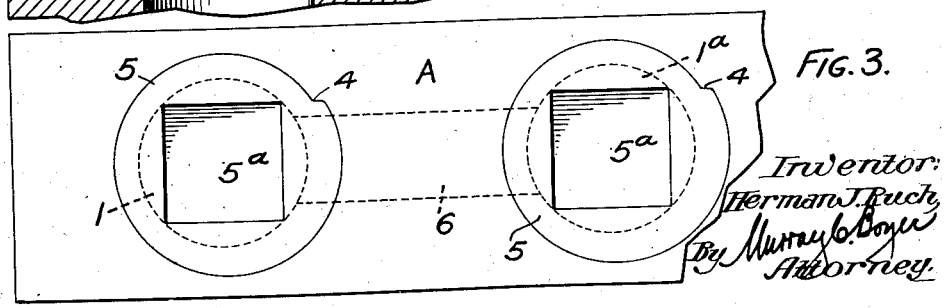

Patented July 27, 1926.

1,594,121

UNITED STATES PATENT OFFICE.

HERMAN J. RUCH, OF WOODBURY HEIGHTS, NEW JERSEY, ASSIGNOR TO SOUTHWARK FOUNDRY & MACHINE COMPANY, OF PHILADELPHIA, PENNSYLVANIA, A CORPORATION OF PENNSYLVANIA.

STEAM PLATEN AND METHOD OF MAKING SAME.

Application filed November 20, 1925. Serial No. 70,404.

My invention relates to steam plates or as they are called, "platens", such as are employed with power presses acting upon plastic material requiring heating or cooling during a pressing operation, and particularly in the curing of rubber or composition goods, or for other purposes where a heated plate is required; such plates or platens having internal passages for the circulation of steam, water, or other fluid media designed to effect the heating or, in some instances, the cooling of the plate for the desired operation in connection with the plastic material undergoing shaping under pressure, or for other purposes. Provision is made for connecting suitable pipes to such plates or platens for the introduction, circulation and withdrawal of such heating or cooling media.

In order that such heating or cooling media, whether liquid or fluid, may be circulated continuously throughout the whole extent of the plate or platen, the several passages therein are in communication with each other and provide a continuous conduit between the inlet and outlet connections.

The present invention comprises a plate or platen having cross passages drilled across the plate or platen usually in one relative direction and substantially at right angles to the sides or marginal edges of such plate or platen; such passages being disposed relatively close together and approximately paralleling each other, with short connecting passages disposed at an angle between pairs of the approximately paralleling cross passages; said connecting passages being disposed inwardly with respect to the open ends of said cross passages, and arranged on opposite sides of the plate or platen between alternate pairs of such approximately paralleling cross passages, so that a continuous conduit following a circuitous path for the circulation of temperature controlling media, usually steam, is provided.

My invention includes the method of providing a continuous conduit in the plate or platen by forming these short connecting passages between pairs of cross passages by means of a controllable metal-cutting flame, preferably directed at an angle, to pierce the wall between adjacent cross passages which may be drilled through the plate from side to side of the latter. In some instances alternate cross passages may be drilled from one edge only of the platen.

These and other features of my invention are more fully described hereinafter; reference being had to the accompanying drawings, in which:

Figure 1, is a plan view of one form of heating plate within the scope of my invention; the cross passages and the flame-cut angular connecting passages forming the continuous conduit being shown by dotted lines.

Fig. 2, is an enlarged sectional plan view of a portion of the structure shown in Fig. 1, clearly illustrating the improved features forming the subject of my invention, and Fig. 3, is an end elevation or edge view of that portion of the plate shown in Fig. 2.

The plate or platen indicated at A, Fig. 1, is of the same general type as that illustrated in the patent of Richard W. Dinzl, No. 1,549,464, dated Aug. 11, 1925, and my improvements, while not limited thereto, are particularly applicable in the preparation of these relatively thin plates or platens, especially when of large dimensions lengthwise and where it is impossible to drill passages in one direction with respect to such plates, that is to say longitudinally of the same when of great length.

In producing my improved plate or platen, a solid steel plate, such as indicated at A, is formed in the usual manner; such plate or platen being usually rectangular in contour and of uniform thickness, and of a dimension permitting the drilling of cross passages in one direction and connections therefor to form a continuous conduit for the circulation of temperature controlling media.

In the drawings, the cross passages of the plate or platen A are indicated at 1, 1ª, 1ᵇ, 1ᶜ, et seq., and may extend from side to side of said plate or platen, that is to say, from one margin or edge 2, to the opposite margin or edge 3. It will be understood of course that in some instances alternate passages may be drilled from one side or edge only of the plate or platen; stopping short of the opposite edge or side.

Each of these cross passages has its marginal opening subsequently enlarged and threaded, as indicated at 4, for the reception of a screw plug, indicated at 5; such plugs being socketed at 5ª for the application of a suitable non-circular tool to turn the same into or out of its socket; such plugs being removable for the purpose of cleaning the passages or for any other reason.

In order to provide communication between adjacent cross passages, usually at opposite ends of pairs of the same alternately disposed, so that a continuous conduit may exist within the body of the plate or platen for the circulation of the heating or cooling media, I propose to cut the metal wall between adjacent pairs of cross passages by means of a metal-cutting flame of any well known and available type.

As indicated in the drawings, this flame may be directed by a suitable burner B, of a size and character permitting introduction into any one of the cross passages, 1, 1ª, 1ᵇ, 1ᶜ, et seq.; the cutting-flame being preferably directed at an angle with respect to the said cross passages, as indicated in the drawings, to produce connecting passages, indicated at 6, thereby providing the desired continuous conduit within the body of the plate or platen. As these flame-cut passages are usually single openings between pairs of the cross passages, one passage of each pair may stop short of the edge or side of the plate or platen, that is to say, alternate passages may be drilled from one edge or side only of the plate or platen. This arrangement also reduces the number of holes to be closed by the screw plugs 5.

Preferably the flame-cut holes start from a point below the root of the recesses receiving the screw plug closures 5, so as to be entirely independent of any association therewith, permitting such screw plug closures to be forced to their seats without the necessity of paying any attention to the position of the same with respect to the flame-cut connecting passages between the cross passages.

After the angular flame-cut passages 6 have been formed, the enlarged recesses at the ends of the cross passages may be threaded in the usual way and then the screw plugs 5 are applied to close the same. When this has been done, the finished plate or platen is provided with a continuous conduit made up of the cross passages 1, 1ª, 1ᵇ, 1ᶜ, et seq., and the flame-cut connecting passages 6, disposed between alternate pairs of such cross passages at opposite ends of the same and adjacent to the marginal edges of the plate or platen, for the continuous circulation of heating or cooling media.

For the purpose of circulating the desired heating or cooling media, the cross passages at the ends of the plate or platen may be connected with the pipes 10 and 11, respectively, in communication with a suitable source of heating or cooling media, as the case may be.

I claim:
1. The process of providing continuous conduits in steam platens or similar plates, which consists in forming cross passages in such platens by drilling operations, and connecting alternate pairs of said cross passages by means of flame-cut apertures.

2. The process of providing continuous conduits in steam platens or similar plates, which consists in forming cross passages in such platens, and connecting alternate pairs of said cross passages on opposite sides of the margins of the platen by means of flame-cut apertures.

3. The process of preparing thin-walled metallic platens with continuous conduits for the circulation of a temperature-controlling medium, which consists in providing such platens with cross passages in relatively close arrangement, some of which cross passages may extend to at least one edge of the platen, and connecting alternate pairs of such passages by removing a portion of the metal wall between such adjacent cross passages by a controllable flame having a melting temperature.

4. The process of preparing thin-walled temperature-controlling platens with continuous conduits, which consists in providing such platens with cross passages in relatively close arrangement, some of which cross passages may extend to at least one edge of the platen, and removing a portion of the metal wall between such adjacent cross passages by means of a controllable flame having a melting temperature to provide connecting passages.

5. The process of preparing thin-walled metallic platens with continuous conduits for the circulation of a temperature-controlling medium, which consists in providing such platen by drilling operations with a plurality of cross passages in relatively close arrangement and approximately parallel, and connecting alternate pairs of such cross passages at opposite sides of the platen by removing a portion of the metal wall between such adjacent cross passages by a controllable flame having a melting temperature.

6. As a new article of manufacture, a thin-walled metallic platen with a continuous conduit for the circulation of a temperature-controlling medium; said conduit comprising cross passages in relatively close arrangement; some of which passages may extend to at least one edge of the platen, and flame-cut connecting passages between pairs of such cross passages.

7. As a new article of manufacture, a thin-walled metallic platen with a continuous conduit for the circulation of a temperature-controlling medium; said conduit comprising a plurality of cross passages in relatively close arrangement, and flame-cut connecting passages alternately disposed between pairs of such cross passages at opposite sides of the platen.

8. As a new article of manufacture, a thin-walled metallic platen with a continuous conduit for the circulation of a temperature-controlling medium, comprising a plurality of cross passages in relatively close arrangement and approximately parallel extending from side to side of the platen and flame-cut connecting passages disposed between pairs of such cross passages at opposite sides of the platen, in combination with means for closing the open ends of said cross passages.

9. As a new article of manufacture, a thin-walled metallic platen with a continuous conduit for the circulation of a temperature-controlling medium, comprising a plurality of cross passages in relatively close arrangement and approximately parallel extending from side to side of the platen and flame-cut connecting passages disposed between pairs of such cross passages at opposite sides of the platen, in combination with screw plugs for closing the open ends of said cross passages.

10. As a new article of manufacture, a thin-walled metallic platen with a continuous conduit for the circulation of a temperature-controlling medium, comprising a plurality of cross passages in relatively close arrangement extending from side to side of the platen and flame-cut connecting passages disposed between pairs of such cross passages at opposite sides of the platen, in combination with means for closing the open ends of said cross passages; the latter having their ends socketed to receive the closing means and said flame-cut passages being disposed inwardly with respect to the edges of the platen and adjacent to such edges but beyond the sockets receiving the closing means.

11. As a new article of manufacture, a thin-walled metallic platen with a continuous conduit for the circulation of a temperature-controlling medium, comprising a plurality of cross passages in relatively close arrangement extending from side to side of the platen and flame-cut connecting passages disposed between pairs of such cross passages at opposite sides of the platen, in combination with screw plugs for closing the open ends of said cross passages; the latter having their ends socketed to receive such screw plugs and said flame-cut passages being disposed inwardly with respect to the edges of the platen and adjacent to such edges but beyond the sockets reciving the screw plugs.

In witness whereof I have signed this specification.

HERMAN J. RUCH.